3,682,820
Patented Aug. 8, 1972

3,682,820
DRILLING FLUID
Jack H. Kolaian, Wappingers Falls, N.Y., assignor to Texaco Inc., New York, N.Y.
No Drawing. Continuation-in-part of application Ser. No. 633,417, Apr. 25, 1967. This application May 1, 1970, Ser. No. 33,979
Int. Cl. C10m 3/28, 3/34
U.S. Cl. 252—8.5 C
10 Claims

ABSTRACT OF THE DISCLOSURE

An aqueous drilling fluid dispersant and a method of drilling wells using said drilling fluid which contains a substituted benzene dispersant, namely, 1-amino-2-hydroxy-5-methylbenzene, 1-amino-2-hydroxy-4-sulfobenzene, 2,5-dihydroxy-1,4-disulfobenzene and 1-amino-2-hydroxy-4-sulfonaphthalene.

---

This application is a continuation-in-part application of application Ser. No. 633,417, filed Apr. 25, 1967, entitled "Drilling Fluid," now abandoned.

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agiation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid containing clay solids dispersed therein and as the dispersant a substituted benzene compound selected from the group consisting of 1-amino-2-hydroxy-5-methylbenzene, 1-amino-2-hydroxy-4-sulfobenzene, 2,5-dihydroxy-1,4-disulfobenzene, and 1-amino-2-hydroxy-4-sulfonaphthalene, said substituted benzene compound being present in the drilling fluid in an amount sufficient to reduce the viscosity thereof.

The term "substituted benzene" as used in the specification and claims is intended to cover any substituted benzene.

It is known from the article appearing in Zhur. Priklad. Khem. 35, pages 638–647 (1962), "Organic Viscosity Reducers in Clay Solutions" by D. Tischenko and S. Fleisher (CA, 57, 2491g, 1962), that the ortho-dihydroxybenzenesulfonic acids, the ortho-dihydroxy-alpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

It is surprising that these specific compounds are effective drilling fluid dispersants when other related benzene compounds such as meta-dihydroxybenzene and sulfonaphthalenes such as 1-amino-2,4-disulfo-8-hydroxynaphthalene, 1-amino-4,8-disulfonaphthalene, 1,3-dihydroxy-5,7-disulfonaphthalene, 1-hydroxy-3,6-disulfonaphthalene, 2-hydroxy-6,8-disulfonaphthalene, 2-hydroxy-3,6-disulfonaphthalene, are ineffective drilling fluid dispersants.

The substituted benzene compounds of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the substituted benzene compounds of the present invention is from about 0.25 to about 5 lbs. per barrel of drilling fluid for most consistent results and efficiency.

The substituted benzene compounds employed in the present invention are known compounds and the manner of their preparation is known in the art.

In the following tables, gel strength (Gels) is reported as determined by a shearometer in accordance with the procedure in the American Petroleum Institute publication RP-29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield point (YP) is calculated by subtracting the plastic viscosity (PV) from the Fann viscosity reading at 300 r.p.m. Plastic viscosity (PV) is obtained by calculation, subtracting the Fann reading at 300 r.p.m. from the 600 r.p.m. reading. Apparent viscosity (AV) is equal to one half of the Fann viscosity reading obtained at 600 r.p.m. The fluidity of a mud can be back calculated from these data, the results being expressed in Fann viscosity at 600 r.p.m. and 300 r.p.m. for a direct reading viscosimeter.

The test data set forth in the following tables indicate the advantages of the substituted benzene compounds of the present invention as drilling fluid dispersants and demonstrate the beneficial results of same in improving the dispersibility of drilling fluids.

Representative physical properties of drilling fluids both before and after addition of various materials including the substituted benzene compounds of the present invention are shown in the tables. In each example the amount of material or materials added to the base muds, if any, are shown, expressed in terms of pounds of material per barrel of drilling fluid.

TABLE I

| Ex. | Type mud | Amount and type dispersant | PV | YP | Ap. viscosity cps. | Shearometer gels, lb./100 ft.[2] 0' | 10' | pH | API W.L. cc. | Time, hrs. |
|---|---|---|---|---|---|---|---|---|---|---|
| 1 | LpH[1] | 0.25 A[a] | 9 | 15 | 16.5 | | | | | 0.25 |
| | | | 15 | 12 | 21 | | | | | 2 |
| | | | 24 | 7 | 27.5 | 0[3] | 3.5 | 9.4 | 16.4 | 16 |
| 2 | LpH | 0.5 B[b] | 11 | 22 | 22 | | | | | 0.25 |
| | | | 11 | 23 | 22.5 | | | | | 2 |
| | | | 18 | 14 | 25 | 0' | 7 | 9.6 | 12.8 | 16 |
| 3 | LpH | 1.0 C[c] | 12 | 4 | 14 | | 10.7 | | | 24 |

[1] LpH, low pH mud.
[a] A = 1-amino-2-hydroxy-5-methylbenzene.
[b] B = 1-amino-2-hydroxy-4-sulfobenzene.
[c] C = 2,5-dihydroxy-1,4-disulfobenzene.

The data in Table I above show that the specific compounds 1-amino-2-hydroxy-5-methylbenzene, 1-amino-2-hydroxy-4-sulfobenzene and 2,5-dihydroxy-1,4-disulfo-

TABLE II

| Ex. | Type mud | Amount and type dispersant | PV | YP | Ap. viscosity, cps. | Shearometer gels, lb./100 ft.[2] 0' | 10' | pH | Time, hrs. |
|---|---|---|---|---|---|---|---|---|---|
| 4 | LpH* | 0.5 D[1] | 15 | 15 | 22.5 | | | 9.3 | 2 |
| | | 1.0 D | 16 | 9 | 20.5 | | | 9.1 | 2 |
| Comparative Ex.: | | | | | | | | | |
| AA | LpH | 0.5 AA[2] | 10 | 42 | 31 | | | 9.5 | 0.25 |
| | | | 15 | 29 | 29.5 | | | 9.3 | 2 |
| | | | 17 | 37 | 34.5 | 18 | 40 | 9.5 | 16 |
| | | 2.0 AA | 3 | 84 | 45 | | | 9.8 | 0.25 |
| | | | 9 | 48 | 33 | | | 9.5 | 2 |
| | | | 15 | 39 | 33 | 26 | 50 | 9.5 | 16 |
| BB | LpH | 0.5 BB[3] | 12 | 36 | 30 | | | 9.5 | 0.25 |
| | | | 13 | 34 | 30 | | | 9.4 | 2 |
| | | | 15 | 37 | 33.5 | 26 | 45 | 9.4 | 16 |
| | | 1.0 BB | 6 | 47 | 29.5 | | | 9.6 | 0.25 |
| | | | 7 | 43 | 28.5 | | | 9.3 | 2 |
| | | | 14 | 40 | 34 | 26 | 45 | 9.4 | 16 |
| | | 1.5 BB | 12 | 26 | 25 | | | | 0.25 |
| | | | 10 | 28 | 24 | | | | 2 |
| | | | 10 | 24 | 22 | 13 | 19 | 9.2 | 16 |
| CC | LpH | 0.5 CC[4] | 5 | 48 | 29 | | | 9.5 | 0.25 |
| | | | 10 | 45 | 32.5 | | | 9.3 | 2 |
| | | | 13 | 54 | 40 | 32 | 60 | 9.5 | 16 |
| | | 2.0 CC | 6 | 82 | 47 | | | 9.4 | 0.25 |
| | | | 4 | 80 | 44 | | | 9.3 | 2 |
| | | | 10 | 80 | 50 | >45 | 60 | 9.3 | 16 |
| DD | LpH | 0.5 DD[5] | 13 | 37 | 31.5 | | | 9.4 | 0.25 |
| | | | 9 | 50 | 34 | | | 9.6 | 2 |
| | | | 14 | 47 | 37.5 | >30 | 60 | 9.4 | 16 |
| | | 2.0 DD | 3 | 74 | 40 | | | 9.5 | 0.25 |
| | | | 10 | 69 | 44.5 | | | 9.6 | 2 |
| | | | 10 | 63 | 41.5 | 40 | 60 | 9.7 | 16 |
| EE | LpH | 0.5 EE[6] | 10 | 27 | 23.5 | | | 9.7 | 0.25 |
| | | | 11 | 26 | 24 | | | 9.3 | 2 |
| | | | 16 | 27 | 29.5 | 9.5 | 17 | 9.5 | 16 |
| | | 1.5 EE | 9 | 51 | 34.5 | | | 9.5 | 0.25 |
| | | | 11 | 48 | 35 | | | 9.5 | 2 |
| | | | 14 | 36 | 32 | 24 | 40 | 9.4 | 16 |
| FF | LpH | 0.5 FF[7] | 11 | 28 | 25 | | | 9.7 | 0.25 |
| | | | 11 | 27 | 24.5 | | | 9.4 | 2 |
| | | | 11 | 34 | 28 | 13 | 28 | 9.5 | 16 |
| | | 2.0 FF | 13 | 42 | 34 | | | 9.6 | 0.25 |
| | | | 8 | 41 | 28.5 | | | 9.3 | 2 |
| | | | 12 | 33 | 28.5 | 21 | 35 | 9.3 | 16 |

[1] D = 1-amino-2-hydroxy-4-sulfonaphthalene.
[2] AA = 1-amino-8-hydroxy-2,4-disulfonaphthalene.
[3] BB = 2-hydroxy-3,6-disulfonaphthalene.
[4] CC = 2-hydroxy-6,8-disulfonaphthalene.
[5] DD = 1-amino-4,8-disulfonaphthalene.
[6] EE = 1,3-dihydroxy-5,7-disulfonaphthalene.
[7] FF = 1-hydroxy-3,6-disulfonaphthalene.
*LpH, low pH mud.

benzene are effective as drilling fluid dispersants in low pH mud systems at concentrations of 0.25 to 1.0 pound per barrel.

The data presented in Table II above show that the 1-amino-2-hydroxy-4-sulfonaphthalene compound of the present invention is an effective dispersion in low pH drilling fluids as is evidenced by the relatively low plastic viscosity and yield point values obtained with this compound.

This table also shows that other sulfonaphthalene compounds such as those specifically identified as compounds AA through FF above are ineffective dispersants in low pH mud systems since the plastic viscosity and/or yield point values obtained with these compounds are relatively high.

Obviously, many modifications and variations of the invention as hereinbefore set forth may be made without departing from the spirit and scope thereof and therefore only such limitations should be imposed as are indicated in the appended claims.

I claim:

1. An aqueous drilling fluid containing clay solids dispersed therein and as the dispersant from 0.1 to 10 pounds per barrel of drilling fluid of a substituted benzene compound selected from the group consisting of 1-amino-2-hydroxy - 5 - methylbenzene, 1-amino-2-hydroxy-4-sulfobenzene, and 1-amino-2-hydroxy-4-sulfonaphthalene, said substituted benzene compound being present in the drilling fluid in an amount sufficient to reduce the viscosity thereof.

2. An aqueous drilling fluid as claimed in claim 1 wherein the substituted benzene compound is 1-amino-2-hydroxy-5-methylbenzene.

3. An aqueous drilling fluid as claimed in claim 1 wherein the substituted benzene compound is 1-amino-2-hydroxy-4-sulfobenzene.

4. An aqueous drilling fluid as claimed in claim 1 wherein the substituted benzene compound is 1-amino-2-hydroxy-4-sulfonaphthalene.

5. An aqueous drilling fluid as claimed in claim 1 wherein the substituted benzene compound is present in the drilling fluid in an amount of from about 0.25 to 5 pounds per barrel of drilling fluid.

6. A method of drilling wells wherein a drilling fluid is passed through the well in contact with earth formations during the drilling operation, the improvement which comprises contacting said earth formations with an aqueous drilling fluid containing clay solids dispersed therein and as the dispersant from about 0.1 to 10 pounds per barrel of drilling fluid of a substituted benzene compound selected from the group consisting of 1-amino-2-hydroxy-5-methylbenzene, 1-amino-2-hydroxy-4-sulfobenzene, and 1-amino-2-hydroxy-4-sulfonaphthalene.

7. A method as claimed in claim 6 wherein the substituted benzene compound is 1-amino-2-hydroxy-5-methylbenzene.

8. A method as claimed in claim 6 wherein the substituted benzene compound is 1-amino-2-hydroxy-4-sulfobenzene.

9. A method as claimed in claim 6 wherein the substituted benzene compound is 1-amino-2-hydroxy-4-sulfonaphthalene.

10. A method as claimed in claim 6 wherein the substituted benzene compound is present in the drilling fluid in an amount of from about 0.25 to 5 pounds per barrel of drilling fluid.

References Cited
UNITED STATES PATENTS

| | | | |
|---|---|---|---|
| 3,558,487 | 1/1971 | Stratton | 252—8.5 |
| 1,421,722 | 7/1922 | Romer et al. | 260—512 X |
| 2,333,133 | 11/1943 | Wayne | 252—8.5 |
| 2,091,743 | 8/1937 | Straub et al. | 260—509 |

OTHER REFERENCES

Tishchenko et al., article in Journal of Applied Chemistry of the U.S.S.R., vol. 35, No. 3, March 1962, pp. 611 to 619.

Roberts et al., Basic Principles of Organic Chemistry, pub. 1964 by U. A. Benjamin, Inc., New York, pp. 918 and 919.

HERBERT B. GUYNN, Primary Examiner

U.S. Cl. X.R.

252—353, 355, 357

PO-1050
(5/69)

UNITED STATES PATENT OFFICE
CERTIFICATE OF CORRECTION

Patent No. 3,682,820      Dated August 8, 1972

Inventor(s) Jack H. Kolaian

It is certified that error appears in the above-identified patent and that said Letters Patent are hereby corrected as shown below:

Col. 2, line 12    "dihvdroxy" should read --dihydroxy--
Col. 3, Table 1    "0'" under "shearometer gels" should read --0"--

Signed and sealed this 30th day of January 1973.

(SEAL)
Attest:

EDWARD M. FLETCHER, JR.            ROBERT GOTTSCHALK
Attesting Officer                  Commissioner of Patents